United States Patent [19]

Lang et al.

[11] 4,016,518
[45] Apr. 5, 1977

[54] CIRCUIT BREAKER WITH IMPROVED SINGLE COIL ACTUATOR AND UNDERVOLTAGE RELEASE MECHANISM

[75] Inventors: Walter W. Lang, South Beaver Township; Alan B. Shimp, Monroeville, both of Pa.

[73] Assignee: Westinghouse Electric Corporation, Pittsburgh, Pa.

[22] Filed: Sept. 25, 1975

[21] Appl. No.: 616,709

[52] U.S. Cl. .................................. 335/7; 335/20; 361/187

[51] Int. Cl.² .................................. H01H 83/12

[58] Field of Search ............. 335/7, 20, 21, 38, 41, 335/174; 317/13, 31

[56] References Cited

UNITED STATES PATENTS

| 3,611,215 | 10/1971 | Patel | 335/20 |
|---|---|---|---|
| 3,688,227 | 8/1972 | Hong | 335/7 |

*Primary Examiner*—George Harris
*Attorney, Agent, or Firm*—Robert E. Converse, Jr.

[57] ABSTRACT

A multipole circuit breaker including a trip release actuator having a single coil coaxially surrounding a plunger and mounted within a hollow cylindrical actuator support frame. The actuator is mounted in association with a latch mechanism and includes a spring biasing the plunger toward release of the latch mechanism. The coil is responsive to an electronic sensing and control circuit and serves, when energized, to oppose the action of the bias spring and maintain the plunger in a position to prevent release of the latch mechanism during normal conditions. Upon either undervoltage or overcurrent conditions the sensing and control circuit deenergizes the coil, allowing the bias spring to move the plunger into engagement with the latch mechanism, effecting release of the latch mechanism and separation of the circuit breaker contacts.

19 Claims, 5 Drawing Figures

CIRCUIT BREAKER WITH IMPROVED SINGLE COIL ACTUATOR AND UNDERVOLTAGE RELEASE MECHANISM

CROSS-REFERENCES TO RELATED APPLICATIONS

The invention is related to material disclosed in the copending U.S. patent applications Ser. No. 595,183, filed July 11, 1975, by Walter W. Lang and John T. Wilson and Ser. No. 595,184, filed July 11, 1975, by Walter W. Lang, John A. Wafer, Walter V. Bratkowski, and Suresh K. Bhate, both of which applications are assigned to the assignee of the present invention.

BACKGROUND OF THE INVENTION

1. Field of the Invention

The invention relates to circuit breakers, and more particularly to circuit breakers having shunt trip mechanisms with undervoltage release capability.

2. Description of the Prior Art

Circuit breakers are widely used in industrial, commercial, and residential applications to provide protection for electrical apparatus and distribution equipment. Upon overcurrent conditions through a connected circuit, the circuit breaker will automatically open to interrupt current flow through the circuit. In order to protect multi-phase circuits, the circuit breaker must have a plurality of poles, one for each phase of the circuit being protected. Overcurrent conditions through any one of the several phases must cause the circuit breaker to automatically interrupt the current flow therethrough.

In addition to the previously mentioned overcurrent tripping capabilities, certain applications, such as in the mining industry, require a fail-safe undervoltage release or remote tripping capability. This requires that the circuit breaker be tripped whenever a control voltage falls below a predetermined minimum.

Many multipole circuit breakers in the prior art employed a separate trip mechanism for each pole. These trip mechanisms were connected by a pole-to-pole trip bar or similar mechanism so that actuation of any one of the several trip mechanisms would result in a tripping operation on all poles of the circuit breaker. Such a circuit breaker is described in U.S. Pat. No. 3,422,381, issued Jan. 19, 1969 to Julius Toth and assigned to the assignee of the present invention. Undervoltage release capability could be provided by a hold-in type solenoid connected to an external control line. When voltage on this control line fell below a predetermined value the solenoid would release, striking the pole-to-pole trip bar and releasing the latch mechanism of the circuit breaker.

Requirements for more flexible adjustment of time-current tripping characteristics have resulted in the development of circuit breakers employing a single trip actuator energized by an electronic circuit which senses the current flow through each phase of the multipole circuit breaker. Overcurrent conditions through one or more phases of the circuit breaker will cause the electronic circuit to energize the single shunt trip actuator and cause release of the latch mechanism to separate the circuit breaker contacts. This type of shunt trip actuator eliminates the need for trip bars or other complex pole-to-pole mechanisms. However, it is difficult to modify existing undervoltage release mechanisms for use with circuit breakers which do not employ the pole-to-pole mechanisms. It is desirable, therefore, to provide a circuit breaker incorporating an undervoltage release mechanism compatible with a single shunt trip actuator.

In many circuit breakers, the space available for installation of trip mechanisms and undervoltage release mechanisms is extremely limited. Thus, it is desirable to provide a compact unitary latch release actuator comprising a combined trip actuator and undervoltage release mechanism.

Some circuit breakers using an electronic circuit to energize a single shunt trip actuator employ a flux transfer type of shunt trip actuator wherein a signal from the electronic circuit energizes a coil which overcomes the force provided by a permanent magnet to effect release of the trip mechanism. The circuit breaker described in the aforementioned U.S. patent application Ser. No. 595,184 successfully provides an undervoltage release capability by using a second coil as an electromagnet to replace the permanent magnet of the trip actuator. However, under certain conditions the coils of the two-coil actuator interact in the manner of a transformer, thereby slowing the response of the actuator to a tripping signal. It is desirable to provide a multipole circuit breaker using a single trip actuator having undervoltage release capability and a shorter response time. In addition, it is desirable to provide such a circuit breaker which is lower in cost and of simpler construction.

SUMMARY OF THE INVENTION

In accordance with a preferred embodiment of the invention, there is provided a circuit breaker comprising separable contacts, trip means releasable upon actuation to effect separation of the contacts, and a trip release actuator. The trip release actuator comprises a support structure, an actuating member operable first and second conditions for actuating said trip release mechanism when operated to the second condition, means for biasing the actuating member toward the second condition, and unitary means responsive to a single control signal for operating the actuating member between first and second conditions. The circuit breaker also includes control means for generating the control signal, said control means being coupled to the contacts and to control terminals. The control means causes the operating means to operate the actuating member to effect release of the trip means and separation of the contacts whenever overcurrent conditions exist through the contacts and whenever undervoltage conditions exist at the control terminals.

DESCRIPTION OF THE PREFERRED EMBODIMENT

Figure 1:
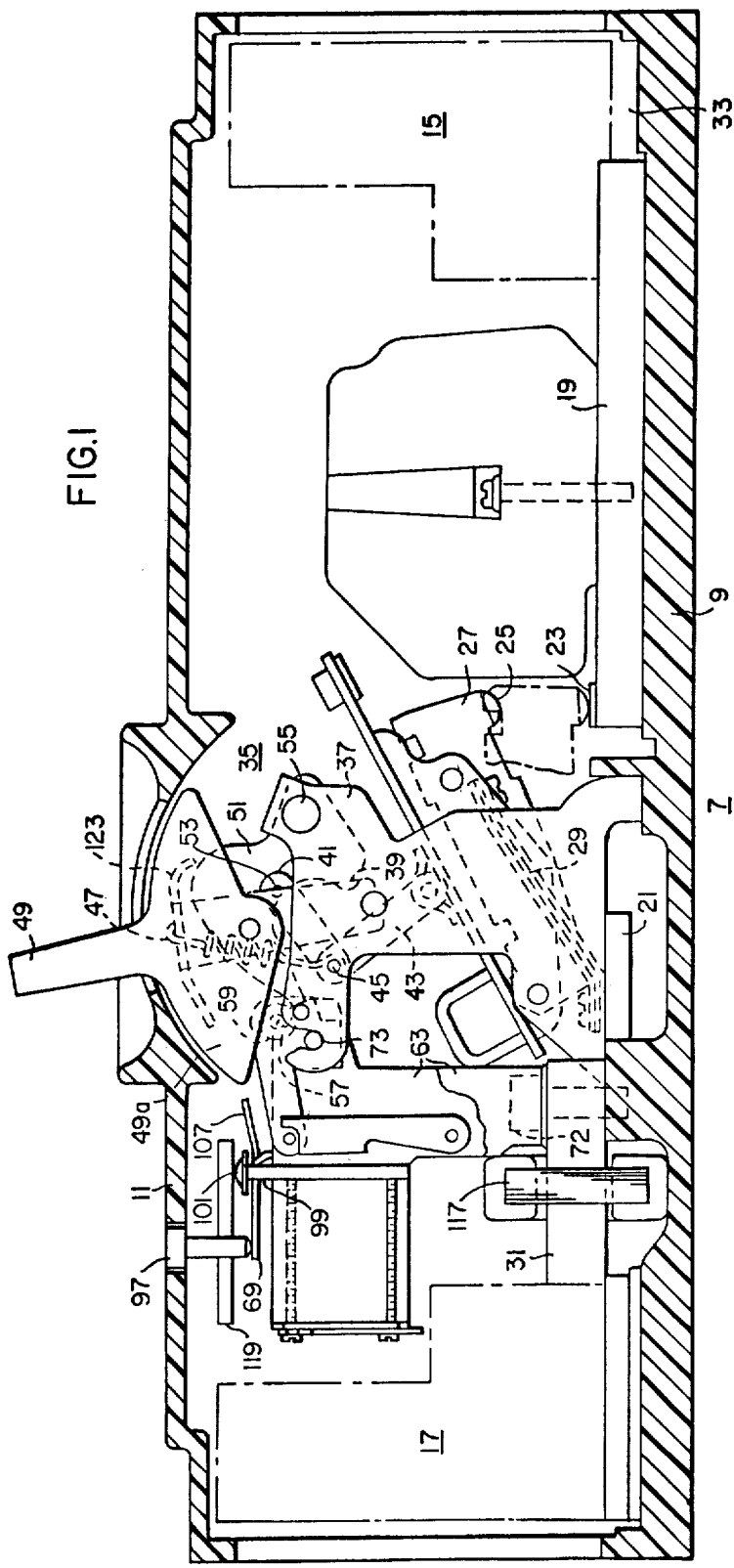
FIG. 1 is a vertical sectional view, with parts broken away, of a circuit breaker employing the principles of the present invention.

Throughout the drawings, like reference characters refers to like members.

A circuit breaker, generally indicated at 7 in FIG. 1, corresponds to that disclosed in U.S. Pat. No. 3,560,683, issued Jan. 24, 1968 to Alfred E. Maier and Albert R. Celerini and assigned to the assignee of the present invention. Thus, certain parts of the circuit breaker 7 will be only briefly described.

The circuit breaker 7 comprises an insulating housing including a molded insulating base 9 with a detachable cover 11. The housing is separated by suitable insulating barrier means into three adjacent insulating compartments for enclosing three complete pole units of the multipole circuit breaker in a manner known in the art. In each pole unit a pair of solderless terminals 15 and 17 are provided at opposite ends of the associated compartment to enable connection of the circuit breaker to an electric circuit.

In each of the three pole unit compartments of the circuit breaker there are spaced conductors 19 and 21, a stationary contact 23 mounted on the conductor 19, a movable contact 25 mounted on a contact arm 27, and a flexible conductor 29 which extends between the contact arm and the conductor 21. The conductor 21 is electrically connected by associated conductor 31 to the terminals 17. A circuit thus extends through the circuit breaker 7 from the terminal 15 through the elements 19, 23, 25, 27, 29, 21, and 31 to the terminal 17. Although the contact arm 27 is shown in the open position, the closed position is shown in broken lines with the contacts 23, 25 in the closed circuit position. A single operating mechanism, generally indicated at 35, for controlling all three circuit poles is mounted in the center pole unit of the circuit breaker. The operating mechanism 35 comprises a frame 37 including spaced supporting plate parts mounted on the base 9, a pivoted forked operating lever 39, upper and lower toggle links 41, 43 pivotally connected by means of a knee pivot pin 45, a pair of tension springs 47, and an insulating handle 49. The upper toggle link 41 is pivotally connected to a movable releasable arm or trip member 51 by means of a pin 53. The releasable arm 51 is pivotally supported on the frame 37 by means of the pivot pin 55. The other end of the releasable arm 51 includes a latch surface 57 which is held in a latched position by a roller 59. The roller 59 is part of a trip mechanism generally indicated at 61, as shown more particularly in FIG. 3.

The trip mechanism 61 comprises a frame 63, a cross plate 99, the roller 59, a latch lever 65, a linkage mechanism 67, a reset lever 69, and a trip release actuator 71. The frame 63 is a U-shaped member, the lower portion of which is secured by a bolt 72 extending into the base 9. The trip mechanism 61 is more particularly described in copending U.S. patent application Ser. No. 474,855, filed May 30, 1974 by Maier et al. and assigned to the assignee of the present invention. Thus, the trip mechanism 61 will be only briefly described. The linkage mechanism 67 includes a toggle linkage comprising an upper link 83 pivotally connected at its upper end to the latch lever 65 by a pin 87 and a lower link 85 pivotally connected at its lower end to the frame 63 by a pin 91. The upper links 83 and lower links 85 are pivotally connected to each other by a pin 91. When the circuit breaker is in the closed circuit latched position, the roller 59 is in contact with the surface 57 of the releasable arm 51 and the axis of the pin 91 is slightly to the left (FIG. 3) of a line 93 passing through the axes of the pins 87 and 89. Thus, upward pressure applied by the releasable arm 51 against the roller 59 to cause the lever 65 to rotate counterclockwise and thereby release the arm 51, is resisted by the overcenter toggle mechanism 67, because of the axis of the pin 91.

To trip the circuit breaker 7 from the closed circuit position to the open circuit position, the pin 91 is moved to the right of the line 93 passing through the axes of the pins 87 and 89. The toggle mechanism 67 then collapses to the broken line positions of the upper and lower links as shown in FIG. 3, enabling the lever 67 to rotate counterclockwise, whereby the roller 59 rolls off of the left end of the arm 59 to permit the arm 51 to raise to the unlatched position, as shown by broken line positions of parts 65, 83, 85.

Figure 2:
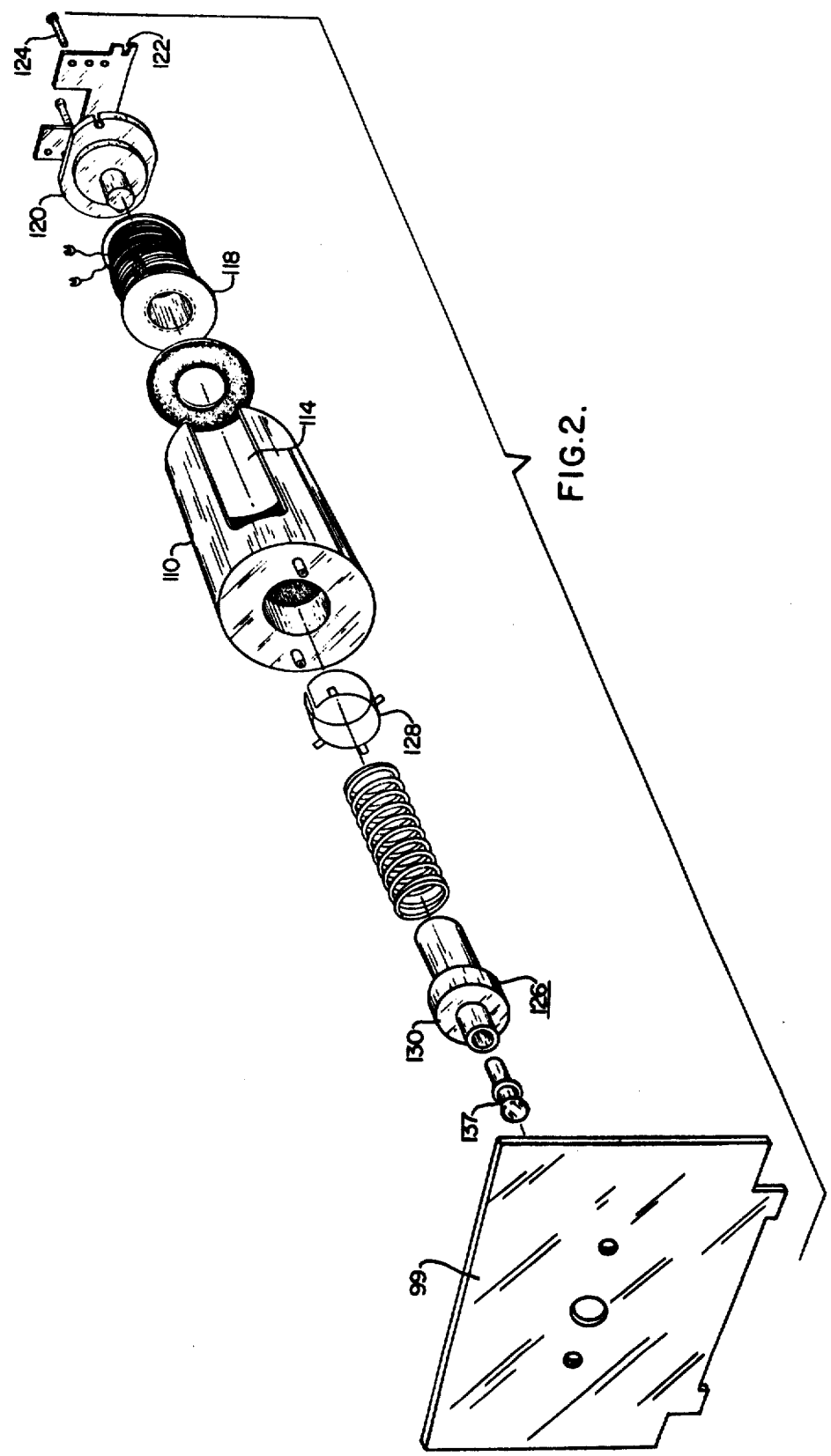
FIG. 2 is an exploded perspective view of the trip release actuator shown in FIG. 1.
Figure 3:
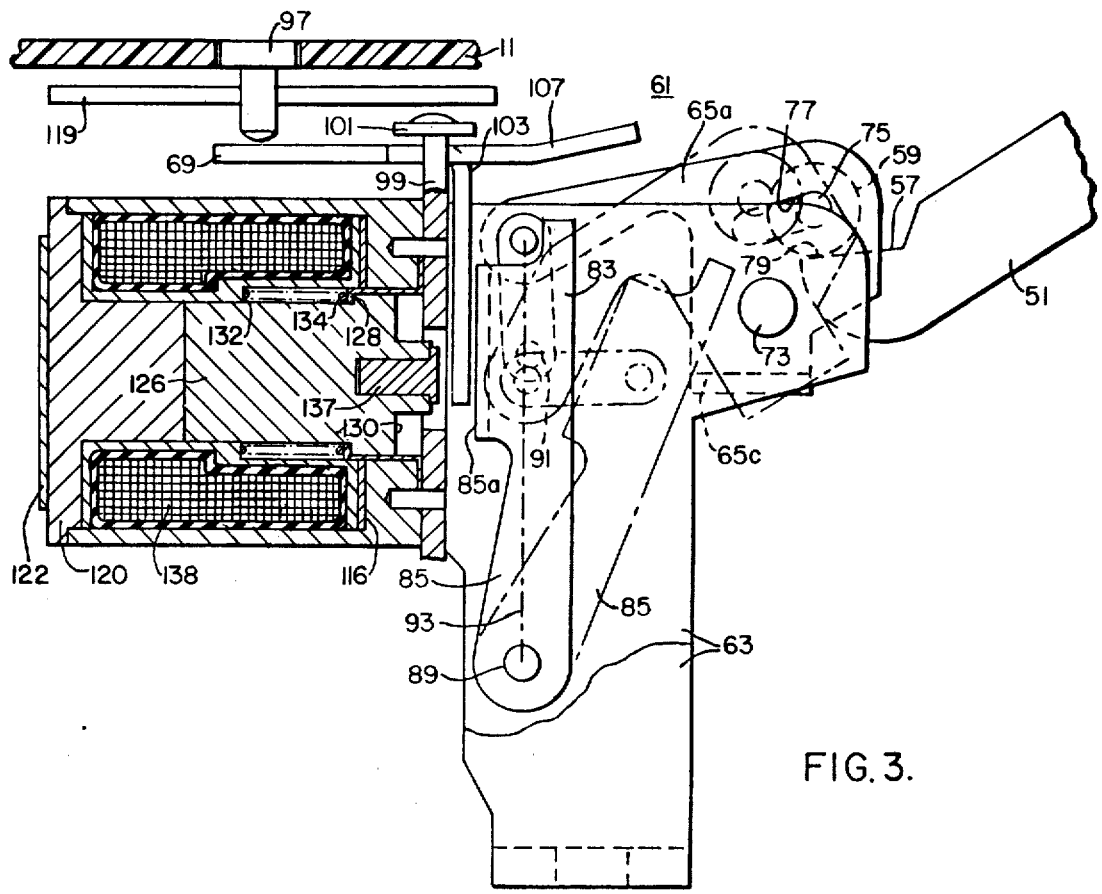
FIG. 3 is an enlarged elevational view, partly in section, of the trip release actuator and latch mechanism shown in FIG. 1.

The trip release actuator 71, shown most clearly in FIGS. 2 and 3, comprises a hollow cylindrical housing 110 having an open end, a closed end including an aperture 112, and a side slot 114. Coaxially mounted within the housing 110 and seated against the inner shoulder 116 thereof is a coil from 118 of nylon or other suitable material. A plunger seat plate 120, of magnetic material, is positioned within the open end of the housing 110 and secured thereto by a back plate 122 and screws 124 which are threaded into the cross plate 99 to secure the trip release actuator 71 to the trip mechanism 61. An operating member or plunger 126 of magnetic material is coaxially mounted within the housing 110 and coil form 118. Seated within the aperture 112 of the housing 110 is a brass bushing 128. Surrounding the plunger 126 and seated between a collar 130 thereof and a spring seat 132 (FIG. 3) of the coil form 118 is a bias spring 134.

Wound about the coil form 118 is a single coil 138. The leads of the coil 138 extend through the side slot 114 of the housing 110 for connection, as will be hereinafter described. The plunger 126 includes a brass pin 137 seated therein for magnetic isolation purposes. As can be seen, the plunger 126 is reciprocally movable within the interior of the coil form 118 from a first condition or position against the plunger seat plate 120 as shown in solid lines in FIG. 3 to a second condition or position shown in dashed lines. The bias spring 134 urges the plunger 126 toward the second position.

Figure 4:
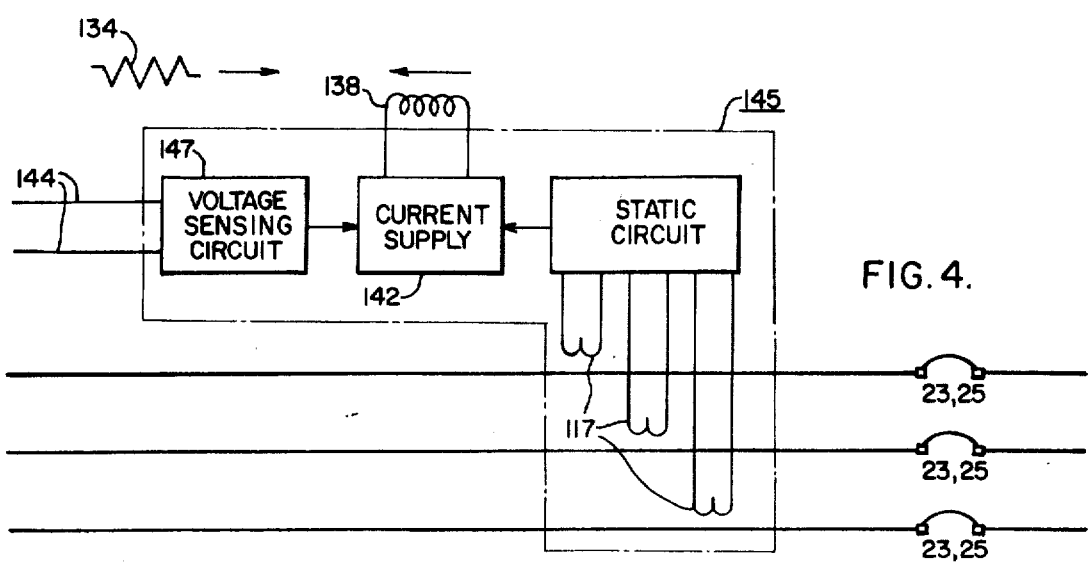
FIG. 4 is a block diagram of electrical circuits suitable for operating the trip release actuator of FIG. 2.

Referring now to FIG. 4, it can be seen that the coil 138 is connected to a control circuit 145 mounted upon a static circuitboard 119. The control circuit 145 consists of a voltage sensing circuit 147 connected to control lines or terminals 144, an overcurrent sensing circuit 146, and a current supply 142. Current transformers 117 coupled to each conductor 31 of the circuit breaker 7 (FIG. 1) feed into the overcurrent sensing circuit 146, the output of which is connected to the current supply 142. The output of the undervoltage sensing circuit 147 is also connected to the current supply 142.

Whenever voltage upon the control line 144 is above a predetermined voltage level as detected by the voltage sensing circuit 147, the current supply 142 energizes the coil 138, generating magnetic flux sufficient to hold the plunger 126 in against the action of the biasing spring 134 in the position shown in solid lines in FIG. 3. Energizing current from the current supply 142 thus constitutes the control signal to the coil 138 of the release actuator 71. When the voltage on the control line 144 drops below a predetermined voltage level, the current supply 142 will deenergize the coil 138, allowing the bias spring 134 to return the plunger 126 to the position shown in dashed lines of FIG. 3, thereby actuating the trip mechanism 61 in the manner hereinbefore described.

The current transformers 117 sense the current flow through the conductors 31 of each pole of the circuit breaker 7. Upon overload conditions, the transformers 117 supply signals to the overcurrent sensing circuit 146, the output of which, in turn, deactivates the current supply 142, thereby ceasing the current flow or control signal to the release actuator 71 and deenergizing the coil 138. This allows the bias spring 134 to throw the plunger 126 to the position shown in dashed lines of FIG. 3 and actuate the trip means 61 to trip the circuit breaker 7 and open the contacts thereof.

Figure 5:
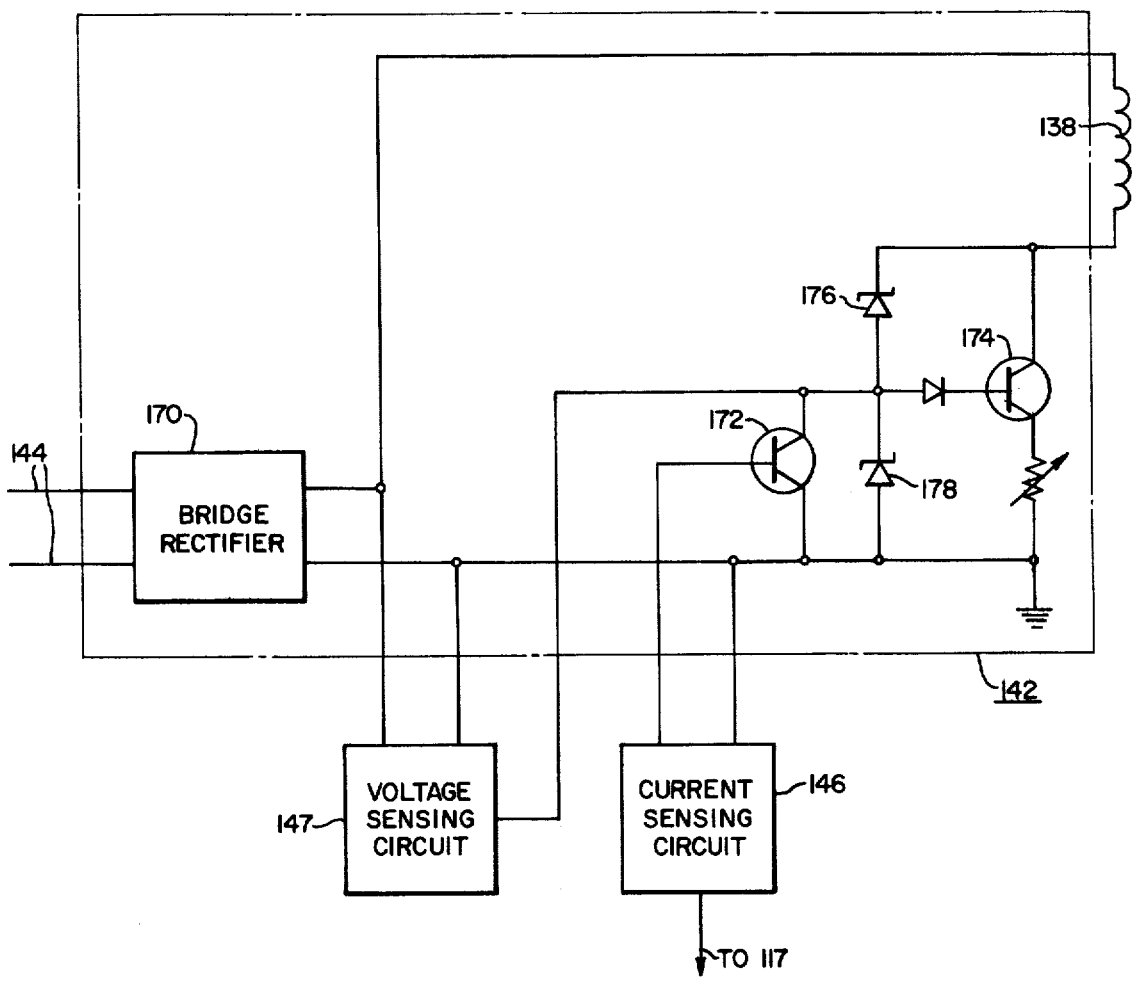
FIG. 5 is a partial schematic diagram of the current supply shown in FIG. 4.

The operation of the current supply 142 can be more fully understood by reference to FIG. 5. The control voltage on control lines 144 is rectified by a bridge rectifier 170 and monitored by the voltage sensing circuit 147. Under normal conditions when the control voltage is above a predetermined voltage level the output of the voltage sensing circuit biases an output transistor 174 to a conducting condition providing a constant current flow through the coil 138. A switching transistor 172 is connected between the output of the voltage sensing circuit 147 and ground. During conditions of normal current flow through the contacts of the circuit breaker as detected by the current transformers 117, the overcurrent sensing circuit 146 biases the switching transistor 172 to a non-conducting condition, thereby maintaining the bias voltage on the base of the output transistor 174. If an overcurrent condition occurs, the overcurrent sensing circuit 146 will bias the switching transistor 172 to a conducting condition which shorts the base of the output transistor 174. Similarly an undervoltage condition on the control lines 144 will cause the voltage sensing circuit 147 to remove bias voltage from the base of output transistor 174. In either case the output transistor 174 will be rendered non-conductive, cutting current flow through the coil 138. This causes an inductive "kick" in the coil 138 as the magnetic field collapses. The zener diode 176 provides a return path for the current developed by this collapse, thereby protecting the output transistor 174. This rapid decrease allows the spring 134 of the trip release actuator to quickly move the plunger 126 to release the trip mechanism of the circuit breaker. The response time between initiation of a fault current and release of the trip mechanism is only 6.2 milliseconds, compared to 9.8 milliseconds for a two-coil trip release actuator. This is an important improvement, for it provides a significant reduction in the duration of an overcurrent condition during which damage could occur on the circuit being protected.

Other advantages are also provided by the single coil design. More space is available inside the actuator. Therefore the single coil can have more turns, maintaining a given amount of ampere-turns with less current flow through the coil. This permits a lower cost output transistor to be used and results in the generation of less heat within the circuit breaker housing. The construction of a single coil trip release actuator is less critical, since there is no need to balance magnetomotive forces as was necessary in a two-coil design. This results in a lower assembly cost.

The circuit breaker 7 may also be tripped by manual operation of a push-to-trip button 97. Such operation causes the button 97 to actuate the release lever 69 which is pivotally mounted at the upper end of the frame 63. The lever 69 includes a downturned portion 103 which is normally disposed adjacent the interconnecting portion of the lower link 85. Accordingly, when the manual button 97 is depressed against the horizontal portion of the lever 69, the downturned portion 103 thereof moves the pin 91 to the right of the line 93, thereby releasing the latched arm 51.

Resetting the circuit breaker 7, the trip means 61, and the latch release actuator 71 is accomplished by rotating the handle 49 (FIG. 1) in a clockwise direction so that a flange 123 on the operating lever 39 contacts and rotates the releasable arm 51 until the latched surface 57 is again in position for contact with roller 59. Simultaneously, a portion 49a of the handle engages the lever extension 107 to return the release levers to the latched positions.

The brass bushing 128 serves to control the dimensions of the nonmagnetic gap between the housing 110 and the plunger 126. The use of a hollow cylindrical housing, cylindrical coil form, and cylindrical plunger serves to give better dimensional control for the various components of the trip release actuator 71. The advantages of faster response time, simpler construction, easier adjustment, and lower cost are obtained by providing both overcurrent and undervoltage tripping capability using a single coil. This is an improvement on the device disclosed in the aforementioned U.S. patent application Ser. No. 595,184. In addition, use of a lower cost control circuit is permitted.

The present invention provides a trip release actuator including overcurrent trip actuation, undervoltage trip actuation, and remote tripping capability. This results in a compact device which is more readily applied to smaller circuit breaker frame sizes. It can be seen, therefore, that the invention provides a circuit breaker with a compact unitary trip release actuator providing multipole overcurrent tripping capability and undervoltage release capability without requiring pole-to-pole connecting mechanisms or multiple coil designs.

We claim:
1. A circuit interrupter, comprising:
    separable contacts;
    trip means operable upon actuation to effect separation of said contacts; and
    a releasable actuator comprising:
        an actuating member operable between first and second conditions, said actuating member actuating said trip means when operated to said second condition;
        means for biasing said actuating member toward said second condition;
        unitary operating means for operating said actuating member between said first and second conditions, said operating means being disposed in relation to said actuating member and responsive to a single control signal; and
        control means connected to said operating means for generating said control signal, said control means being coupled to said contacts and to control terminals, said control means being responsive to overcurrent conditions through said contacts and undervoltage conditions at the control terminals to cause said operating means to operate said actuating member to said second condition, thereby effecting release of said trip means and separation of said contacts.

2. A circuit interrupter as recited in claim 1 wherein said bias means comprises a spring.

3. A circuit interrupter as recited in claim 1 wherein said operating means comprises electromagnetic means.

4. A circuit interrupter as recited in claim 3 wherein said actuating member comprises a generally cylindrical plunger and said electromagnetic means comprises a single coil wound coaxially about said plunger.

5. A circuit interrupter as recited in claim 4 wherein said release actuator comprises a housing supporting said plunger, said bias means, and said coil.

6. A circuit interrupter as recited in claim 5 wherein said coil is wound upon a hollow cylindrical coil form coaxially surrounding said plunger.

7. A circuit interrupter as recited in claim 1 wherein said control means generates said control signal whenever voltage at the control terminals is above a predetermined voltage level, said control means ceasing generation of said control signal whenever voltage at the control terminals falls below the first predetermined level and whenever current through said contacts rises above a predetermined current level.

8. A circuit interrupter as recited in claim 7 wherein said control means comprises an electronic circuit coupled to the control terminal and to said contacts, said control signal comprising a flow of current through said coil.

9. A circuit interrupter as recited in claim 8 wherein said control means further comprises current transformer means coupled to said contacts and said electronic circuit comprises a voltage sensing circuit connected to the control terminals, an overcurrent sensing circuit connected to said current transformer means, and a current control circuit connected in series circuit relationship with said coil; said voltage sensing circuit and said current sensing circuit being connected to said current control circuit and activating said current control circuit to cut off current flow to said coil whenever undervoltage conditions occur at the control terminals and whenever overcurrent conditions occur through said contacts.

10. A circuit breaker as recited in claim 7 wherein said current control circuit comprises switch means having switch output terminals operable between on and off conditions and a switch control terminal, said switch output terminals being connected in series circuit relationship with said coil, and said switch control terminal being connected to said voltage sensing circuit and said overcurrent sensing circuit.

11. A circuit interrupter as recited in claim 10 wherein said switch means comprises a transistor.

12. A circuit interrupter as recited in claim 11 wherein said switch output terminals comprise the emitter and collector of said transistor, said switch control terminal comprises the base of said transistor, and said current control circuit further comprises a Zener diode connected between said collector and said base.

13. A multipole circuit interrupter, comprising:
an interrupter housing;
a plurality of pairs of separable contacts supported within said housing;
trip means supported within said housing and operable upon actuation to effect substantially simultaneous separation of each of said contact pairs;
a release actuator supported within said housing and comprising:
a support structure;
an actuating member movable between first and second positions, said actuating member actuating said trip means when operated to said second position;
means for biasing said actuating member toward said second position; and
operating means disposed in relation to said actuating member and responsive to a single control signal for operating said actuating member between said first and second conditions; and
control means connected to said operating means for generating said control signal, said control means being coupled to said contacts and to control terminals, said control means responsive to overcurrent conditions through said contacts and undervoltage conditions at the control terminals to cause said operating means to operate said actuating member to said second condition, thereby effecting release of said trip means and separation of all of said contact pairs.

14. A multipole circuit breaker as recited in claim 13 wherein said unitary operating means comprises electromagnetic means.

15. A multipole circuit interrupter as recited in claim 14 wherein said actuating member comprises a generally cylindrical plunger.

16. A multipole circuit interrupter as recited in claim 15 wherein said electromagnetic means comprises a coil wound coaxially about said plunger.

17. A multipole circuit interrupter as recited in claim 16 wherein said operating means comprises a cylindrical coil form having a hollow core, said coil being wound upon said coil form, said plunger being reciprocally movable within the hollow core of said coil form.

18. A multipole circuit interrupter as recited in claim 17 wherein said support structure comprises a hollow cylindrical housing of magnetic material surrounding said coil, said coil form, and said plunger; said cylindrical housing being mounted upon said trip means.

19. A multipole circuit interrupter as recited in claim 13 wherein said operating means comprises a single coil disposed about said actuating member and operable when energized to generate magnetic flux sufficient to overcome the action of said bias means and maintain said actuating member in said first condition, thereby preventing actuation of said trip means, deenergization of said coil permitting said bias means to move said actuating member to said second condition and effect actuation of said trip means.

* * * * *